Jan. 14, 1969 S. E. TOWNSEND 3,422,287
PULSE STRETCHING CIRCUIT FOR GENERATING PULSES OF MINIMUM WIDTH
Filed July 8, 1965 Sheet 1 of 2
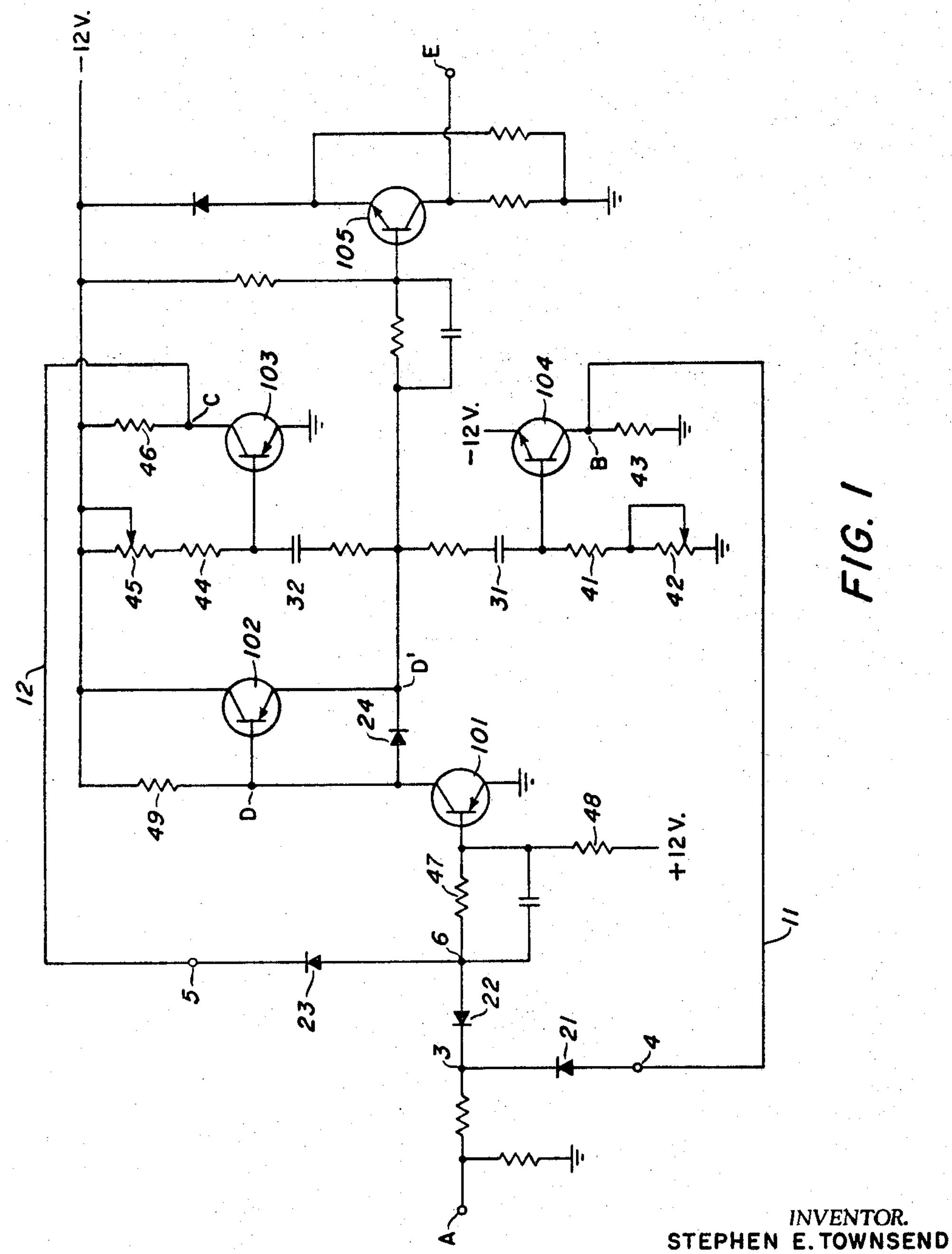
FIG. I
INVENTOR.
STEPHEN E. TOWNSEND
BY Anthony D. Cennamo
ATTORNEYS INVENTOR.
STEPHEN E. TOWNSEND
BY Anthony D. Cennamo
ATTORNEYS United States Patent Office 3,422,287

Patented Jan. 14, 1969

3,422,287

PULSE STRETCHING CIRCUIT FOR GENERATING PULSES OF MINIMUM WIDTH

Stephen E. Townsend, Rochester, N.Y., assignor to Xerox Corporation, Rochester, N.Y., a corporation of New York Filed July 8, 1965, Ser. No. 470,394

U.S. Cl. 307—267 5 Claims

Int. Cl. H03k *1/18*

ABSTRACT OF THE DISCLOSURE

A pulse stretching circuit for generating pulses of minimum width. A two level signal is modified in order that transitions in the adjusted signal will not occur closer together than a predetermined interval.

*Background*

In systems designed for transmission of digitally encoded information, the various circuits that form and reshape the pulses destined to be transmitted, may include a pulse stretching circuit which operates to increase the duration of certain narrow pulses to a point where such pulses are suitable for transmission. Thus, for example, in facsimile applications, a particularly narrow pulse may well represent a definite piece of intelligence; but the transmission facilities provide for the facsimile transmitter may be incapable of transmitting pulses below a certain minimum width. Accordingly, such pulses must be stretched to this minimum width before it becomes at all possible to transmit and reproduce at the facsimile receiver, the information carried thereby.

In accordance with the present invention I have now devised a novel circuit capable of accepting a two-level input signal and operating such that transitions in the output signal therefrom will not occur closer together than specific delays set within the circuit. These delays are set in portions of the circuit which functionally reasemble members of one-shot multi-vibrator arrangements. Unlike the case with conventional one-shot multivibrators, however, the present invention does not incorporate separate transistors paired off with each of the previously mentioned portions of the circuit. Rather, the circuit is so designed that in net effect, a single transistor acts (in an analogous sense) alternately as the second member of a one-shot multivibrator arrangement with first one portion of the circuit and then with a second portion of the circuit.

*Objects*

It is accordingly an object of this invention to provide an improved pulse width limiting circuit.

It is another object of the present invention to provide a pulse width limiting circuit effectively utilizing a reduced number of components.

It is a further object of the present invention to provide a pulse width limiting circuit of simplified design and high reliability of operation.

*Brief summary of the invention*

These and other objects of the invention are achieved by a circuit arrangement which permits the output from a first transistor to act as a trigger for second and third transistors, the latter being arranged with respect of the first transistor in a configuration reasembling a one-shot multi-vibrator. Adjustable circuit means are included for selectively fixing the duration of the pulsed outputs from the latter two transistors, and these pulsed outputs then constitute the set delays in the circuit. Outputs from these latter transistors are fed back into the input of the first transistor whereby transitions in the output signal therefrom will not occur closer together than the delays set. By way of example, only, if the input to the present circuit has been at −12 volts and goes to ground, the circuit output will follow. If the input then returns to −12 volts in less time than the set delay, the output will remain at ground for the duration of the delay. If the input returns to −12 volts after the delay has timed out, the output will follow immediately. Furthermore, when the output goes to −12 volts it will necessarily remain there under the control of a separately adjusted delay for the minimum pulse width to which it is adjusted.

*Description of the drawings*

A fuller understanding of the present invention together with other objects and advantages thereof may be gained from the following detailed specification, to be read in conjunction with the accompanying drawings in which:

FIG. 1 is a schematic circuit diagram of the present invention.

*Detailed description of the invention*

In the description that follows certain voltage levels have been indicated for purposes of concretely illustrating the operation of the present circuit. It will of course be understood that these levels are in no way intended to be a limitation upon the present invention, but are merely designated in order to assist the reader in gaining a fuller understanding of the operation of the circuit.

Figure 2:
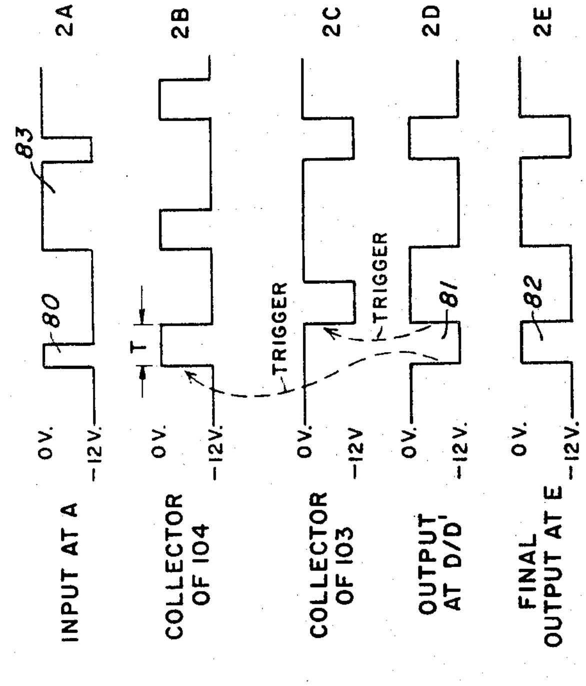
FIG. 2 illustrates the waveforms present at several critical points in the circuit depicted in FIG. 1.

In FIG. 1 an input signal is supplied to the present circuit at point A. In a typical facsimile application, this input signal may be representative of printed information present on a document intended to be transmitted. By the time such information reaches point A, the modulated pulses representative thereof have been well formed into essentially square pulses of uniform height, but of varying width, such as is seen in FIG. 2A. This input is of two discrete levels, and for purposes of illustration is considered to be either at a lower level of −12 volts or at a higher level of 0 volt, i.e. ground potential. The width of such pulses is seen to vary and in general will be either more or less than a critical width which is designated in FIG. 2B by the letter T. This pulse width or duration T may be considered to be that width below which pulses may not be dependably transmitted by a given transmission facility.

To gain an understanding of the operation of the present circuit, let us initially assume that the input signal present at point A is at the level of −12 volts and has been holding at this level for a relatively extended duration. By this is meant that a sufficient time has transpired with the input at −12 volts for all transitions at the outputs of transistors 103 and 104 to have occurred. More specifically—and as will later become apparent—this implies that a sufficient time has transpired with the input at −12 volts for a transition to have fully occurred at the transistor 103. If this is the case, then transistors 103 and 104 will be in a conductive state, and the outputs at their collectors will be at 0 volts and −12 volts respectively. This situation is depicted at the extreme left of FIGS. 2B and 2C.

Under the stated conditions the potential present at the positive side of diode 21, that is to say, at point 4 will be −12 volts. In terms of logical functions point 4 and point A may be considered as the two inputs to a positive OR gate whose output appears at point 3. Under the conditions indicated the potential at point 3 is at −12 volts. Diodes 22 and 23 on the other hand logically function as a negative OR gate, in the sense that a low output will appear at point 6 whenever such an input is present at either or both of the points 3 and 5. Under the conditions given, point 6 will accordingly be at −12 volts. Since resistor 47 will be of considerably smaller value than resistor 48, the net effect of the negative voltage at point 6 will be to produce a forward bias in the emitter-base junction of PNP transistor 101. This transistor is accordingly conductive and a potential level of 0 volts will be present at either point D or point D′. Where—as in the present case—the transistor 101 is conductive, these points are approximately equivalent and either may be considered the point from which the voltage level depicted at the extreme left of FIG. 2D is taken. This output from transistor 101 is then fed to the base of transistor 105, the latter functioning merely as an inverter to bring the sense of final output signal at point E back to the same polarity as the input signal depicted in FIG. 2A. The final output signal at point E is shown in FIG. 2E.

Now let us assume that after the sustained duration of input at −12 volts the input—as depicted in FIG. 2A—suddenly goes to 0 volts. The immediate effect of the positive going pulse at the input of the circuit will be to produce a positive-directed pulse of a duration T at the output of transistor 104. The manner in which this is brought about is best understood by referring to FIG. 3A which shows in detail the circuitry in the immediate vicinity of transistor 104. The potential at point 61 which is there shown in the topmost curve is identical with the output from transistor 101. The flat zero level portion of this curve—depicted by the numeral 66—represents the voltage level appearing at point 61 during the sustained period during which the input to the circuit at point A has held at −12 volts.

In order to fully understand the functioning of transistor 104, we must appreciate that at some earlier point in time the potential level at point 61 was at −12 volts and underwent a pulsed jump to zero. This is shown by portions 64 and 65 of the uppermost curve. When this transition first occurred, the potential placed across capacitor 31 caused a momentary surge as the latter charged. This is depicted by the slight rise shown at point 67 in the middle curve of FIG. 3A. Since transistor 104 remained conductive, a full charging of the capacitor 31 was achieved to a −12 volt potential.

To return to the starting point of the previous paragraph, we will now consider the effect on transistor 104 of the positive-directed pulse introduced at point A of the circuit. As previously discussed, this positive pulse will appear at point 3 as a rise to zero potential and at point 6 as a zero potential as well. This effectively reverse-biases transistor 101 and produces an output from the latter of −12 volts. Actually, it will be appreciated here that the output from transistor 101 may now be considered to appear at point D′ rather than point D. That is to say that the −12 volt potential may now be considered to be derived through the low impedance path now presented by the suddenly conductive transistor 102, rather than through the alternate and relatively high impedance path including resistor 49. It might be well to emphasize here that the transistor 101 serves in the present circuit only as a switching element, and does not perform any logic function whatsoever.

Figures 3A, 3B:
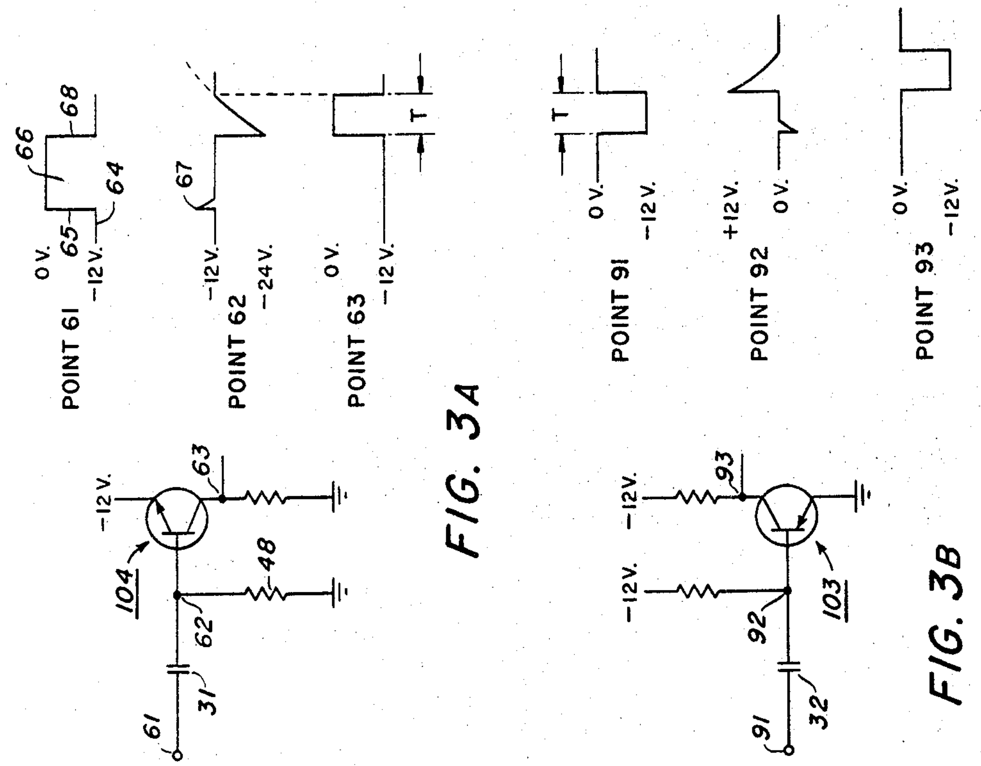
FIG. 3A and FIG. 3B schematically illustrate the circuitry present in the immediate vicinity of transistors 104 and 103, respectively, of FIG. 1, and illustrates in detail the waveforms present at critical points in the vicinity of such circuitry.

Point 61 in FIG. 3A which as previously indicated corresponds in potential to point D′ is accordingly presented with an abrupt potential drop from zero to −12 volts. This is depicted by portion 68 of the topmost curve in FIG. 3A. Because of the −12 volts that has already accrued on capacitor 31 the potential at point 62 immediately falls as shown in the middle curve to a negative peak of −24 volts. This, of course, cuts off the transistor 104 and an immediate positive going pulse is produced at the collector of transistor 104 as shown in the bottom curve. The duration of this pulse at 104 coincides with the cutoff period of the transistor, which in turn is governed by the time it takes point 62 to return to the −12 volt level. This period, which is designated as T in the bottommost curve of 3A, is a function of the capacity of capacitor 31 and of the value of resistor 48. While for purposes of simplification a single resistor 48 has been shown in FIG. 3, it will be seen that a fixed resistor 41 and a variable resistor 42 are actually used in the circuit of FIG. 1. In practice, the varying of resistor 42 serves to vary the time constant for discharging of the capacitor 31, and thereby achieves selective adjustment in the value of T.

As is apparent from FIG. 1 the ground level pulse produced at the collector of transistor 104 is returned via conductor 11 to point 4. Since—as was previously indicated—point A and point 4 constitute the two input branches for a logical OR gate, point 3 will remain at ground potential for as long as either point 3 or point 4 remain at this value. Thus, it is that the output of transistor 101 at point D′ remains at −12 volts for so long as the potential at either point 3 and/or 4 remain at this value. This is depicted by portion 81 of curve 2D, and the corresponding inverted output from transistor 105 is shown as portion 82 of the curve depicted in FIG. 2E.

The pulse-stretching properties of the present circuit are now obvious. In the case just considered the initial positive-directed pulse at point A is—as shown in FIG. 2A—of a duration less than the period T. The pulse width of the output in this instance is thus seen to be determined purely by the delay set within the circuitry incident to transistor 104. That is to say the delay in transition of the final output is determined by the time constant for discharge of capacitor 31. In the case of a pulsed input at A which exceeds the period T—such as pulse 83 of FIG. 2A—the output of the OR gate at point 3 will on the other hand be determined by the continuing pulse at A and not by the shorter duration square pulse put out by transistor 104.

So far we have been considering the case of a positive-directed pulse introduced at point A. The situation that has been described has its precise counterpart where a negative-directed pulse is introduced. In this latter instance, the PNP transistor 103 operates functionally exactly as transistor 104 did for the former case. FIG. 3B shows in detail the circuitry in the vicinity of transistor 103 and the accompanying curves illustrate the waveforms present at points 91, 92, and 93 which are functionally completely equivalent to points 61, 62, and 63 in FIG. 3A.

The negative-directed pulse output from the collector 103 appears via conductor 12 at the point 5. As previously indicated points 3 and 5 may be regarded as the input points to an arrangement including diodes 22 and 23 which is functionally a negative OR gate: that is to say that the structure is an OR gate in the sense that a low output will appear at point 6 where a low output is present at either or both points 3 and 5. Thus, in complete analogy to the case with a positive-directed pulse, a negative output will finally appear at point E of minimum duration equal to the delay set within the circuitry attendant to transistor 103. That is to say, that a negative-directed pulse will appear of duration at least equal to the time constant for the discharge of capacitor 32. This, of course, will be obvious from an examination of the waveforms shown in FIGS. 2A and 2D.

While the present invention has been illustrated for a case where the delays set within the triggered portions of the circuit are of approximately equal duration, it will be clear that one could so adjust the time constants for discharge of capacitors 31 and 32 that delays of a first duration would be present for negative-directed pulses, while delays of a second duration would be present for positive-directed pulses.

While the present invention has been illustrated in terms of a specific embodiment, it will be understood that numerous departures therefrom and variations thereupon may now be readily achieved by those skilled in the art without yet departing from the present teaching. Accordingly, the present invention should be broadly construed and limited only by the scope of the claims now appended.

What is claimed is:

1. A pulse stretching circuit for modifying a two level input signal tendered thereto so that transitions in the output signal therefrom will not occur closer together than a fixed interval comprising:

(a) a transistor switching means for producing a two level output signal in inverse accord with a composite two level signal tendered thereto, (b) a pair of transistor devices of differing conductivity type, the inputs to said devices being coupled to the output signal of said switching means, said pair of devices being responsive to the said two level output of said switching means and producing square pulses of fixed duration and of amplitude equal to the difference of said levels in response to transitions in said output signal from said switching means, said pulses occurring in a direction between said levels governed by the direction of transitions in said output signal from said transistor switching means;

(c) a first coupling means for coupling said two level input signal to said circuit to the input of said transistor switching means, (d) a second coupling means for coupling the output pulses from said pair of transistor devices in a positive feedback relationship to the input of said transistor switching means whereby the output from said transistor switching means will be at a given level for a period not less than the duration of one of said pulses, (e) inverting means including an input and an output for inverting the output from said transistor switching means, said output of said inverting means constituting the output for said circuit, and (f) fourth coupling means for coupling the output from said transistor switching means to the input of said inverting means.

2. A pulse stretching circuit for modifying a two level input signal displaying varying frequencies of transition between the said two levels so that the output signal therefrom will display frequencies of transition not greater than predetermined values comprising:

a pair of normally conductive transistor devices, said devices being responsive to and rendered temporarily non-conductive by the application thereto of the leading edge of a selected relative polarity constant potential level electrical signal, one member of said pair being so responsive to a signal of a given relative polarity and the other member of said pair being so responsive to a signal of opposite relative polarity, each member of said pair of transistor devices being so biased that the output from said device displays transitions between the said two levels in accordance with the state of conduction of said member, each member of said pair of transistor devices having individual input circuit means including adjustable time constant means having a given discharge time constant, said time constant means being connected within said input circuit means so that said time constant means is charged during conductive periods of said member to a potential more than sufficient to render said member non-conductive when the said leading edge of the said constant potential level electrical signal of said selected relative polarity is subsequently applied to said individual input circuit means, said time constant means thereupon acting to maintain said device individual thereto non-conducting for selected time intervals determined by said given discharge time constant thereof, a transistor switching means biased to produce a two level output signal in inverse accord with a composite two level signal tendered thereto, said two level output signal of said transistor switching means being coupled to the said input circuit means to said pair of transistor devices, each of the said two output levels of said switching means constituting one of the said selected relative polarity signals the leading edge of which renders one of said devices temporarily non-conductive, whereby square voltage pulses of height equal to the difference of said two levels defining said input to said circuit are produced by one of said pair of transistor devices each time the said output of said transistor switching means undergoes a transition between levels, first coupling means to couple the said pulses from said pair of transistor devices in a feedback relationship to the input of said transistor switching means, second coupling means to further couple to the input of said transistor switching means said input signal of said circuit whereby the output from said transistor switching means displays transition frequencies governed by both said input signals to said circuit and said pulse feedback from said pair of transistor devices, inverting means including an input and an output for inverting the output from said transistor switching means, said output of said inverting means constituting the output for said circuit, and third coupling means for coupling the output from said transistor switching means to the input of said inverting means.

3. A pulse width limiting circuit for modifying a two level input signal tendered thereto so that transitions in the adjusted signal will not occur closer together than predetermined intervals comprising:

(a) a first normally conducting transistor switch biased to produce pulses at the higher of said two levels in response to a signal rendering said switch non-conducting, the input to said switch including adjustable time constant means whereby said switch is maintained non-conductive in response to said signal for a period determined by said adjustment, the width of said pulses varying in accord with the period of said non-conductivity, (b) a second normally conducting transistor switch biased to produce pulses at the lower of said two levels in response to a signal rendering said switch non-conducting, the input to said switch including adjustable time constant means whereby said switch is maintained non-conductive for a period determined by said adjustment, the width of said pulses varying in accord with the period of said non-conduction, the input to said second transistor switch having a common point with the input to said first transistor switch, (c) a positive OR gate, (d) a negative OR gate, (e) first coupling means to couple the said two level input signal to one input of said positive OR gate, (f) second coupling means to couple the said pulses from the output of said first transistor switch to the other input of said positive OR gate, (g) means to couple the output of said positive OR gate to one input of said negative OR gate, (h) means to couple said pulses from the output of said second transistor switch to the other input of said negative OR gate, (i) transistor switching means to couple the output of said negative OR gate to the inputs of said first and second transistor switches so that upward transitions in the said output of said negative OR gate constitute the said signal which renders said first transistor switch non-conductive, and downward transitions in the said output of said negative OR gate constitute the said signal which renders the said second transistor switch non-conductive, and (j) output means, coupled to the said point common to said inputs of said first and second transistor switches, for extracting the circuit output therefrom.

4. A pulse stretching circuit for generating pulses of at least a minimum width from a two level input signal displaying varying durations between level transitions applied thereto comprising input means for receiving said two level input signal, first feedback loop means responsive to positive-going edges in said two level input signal for generating said pulses of at least said minimum width after a first predetermined delay, second feedback loop means responsive to negative-going edges in said two level input signal for generating said pulses of at least said minimum width after a second predetermined delay, first and second coupling means for coupling said feedback pulses from said first and second feedback loop means, respectively, back to said input means, said first feedback loop means comprising:

first delay means for generating pulses of said minimum width in response to said positive-going edges, and wherein said first coupling means comprises first gating means coupled to said first delay means and said input means for generating positive pulses at least of said minimum width, and wherein said second feedback loop means comprises, second delay means for generating pulses of said minimum width in response to said negative going edges, and wherein said second coupling means comprises second gating means coupled to said second delay means and said input means for generating negative pulses at least of said minimum width.

5. The circuit as set forth in claim 4 further including switch means common to said first and second feedback loops for energizing said first and second delay means at the positive and negative transitions of said two level input signals.

References Cited

UNITED STATES PATENTS

| | | | |
|---|---|---|---|
| 3,075,089 | 1/1963 | Maley | 307—88.5 |
| 3,263,090 | 7/1966 | Blocher | 328—58 |
| 3,158,751 | 11/1964 | Nelson | 307—88.5 |
| 3,193,701 | 7/1965 | Lawhon | 307—88.5 |

ARTHUR GAUSS, *Primary Examiner.*

S. D. MILLER, *Assistant Examiner.*

U.S. Cl. X.R.

307—234, 268, 273, 288, 293; 328—58